United States Patent
Karlsson et al.

(10) Patent No.: US 10,259,935 B2
(45) Date of Patent: Apr. 16, 2019

(54) FLAME RETARDANT POLYPROPYLENE COMPOSITION

(71) Applicant: Borealis AG, Vienna (AT)

(72) Inventors: Linus Karlsson, Goteborg (SE); Bernt-Ake Sultan, Stenungsund (SE); Fredrik Skogman, Stenungsund (SE); Joerg H. M. Ruder, Schwanstetten (DE); Claus Beisert, Schwabach (DE)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/540,582

(22) PCT Filed: Jan. 13, 2016

(86) PCT No.: PCT/EP2016/000052
§ 371 (c)(1),
(2) Date: Jun. 29, 2017

(87) PCT Pub. No.: WO2016/119995
PCT Pub. Date: Aug. 4, 2016

(65) Prior Publication Data
US 2018/0016426 A1      Jan. 18, 2018

(30) Foreign Application Priority Data

Jan. 27, 2015   (EP) .................................... 15000234

(51) Int. Cl.
| | |
|---|---|
| *C08L 23/12* | (2006.01) |
| *C08L 23/16* | (2006.01) |
| *C08K 3/22* | (2006.01) |
| *C09K 21/02* | (2006.01) |
| *H01B 7/295* | (2006.01) |

(52) U.S. Cl.
CPC ............... *C08L 23/12* (2013.01); *C08K 3/22* (2013.01); *C08L 23/16* (2013.01); *C09K 21/02* (2013.01); *H01B 7/295* (2013.01); *C08K 2003/2224* (2013.01); *C08L 2201/02* (2013.01); *C08L 2203/202* (2013.01); *C08L 2207/02* (2013.01)

(58) Field of Classification Search
CPC ........... C08L 23/12; C08L 23/16; C08K 3/22; C08K 2003/2224
See application file for complete search history.

(56) References Cited

U.S. PATENT DOCUMENTS

| | | |
|---|---|---|
| 6,673,855 B1 | 1/2004 | Braga et al. |
| 2002/0045698 A1 | 4/2002 | Ayama et al. |
| 2008/0306198 A1 | 12/2008 | Zuchelli et al. |
| 2011/0253420 A1 | 10/2011 | Sultan et al. |
| 2014/0080953 A1 | 3/2014 | Goberti et al. |

FOREIGN PATENT DOCUMENTS

| | | | |
|---|---|---|---|
| EP | 1857502 A1 * | 11/2007 | ............... C08L 23/10 |
| EP | 1857502 A1 | 11/2007 | |
| EP | 1862496 A1 | 12/2007 | |
| WO | WO 2013/030795 A1 | 3/2013 | |

OTHER PUBLICATIONS

Grestenberger et al., eEXPRESS Polymer Letters vol. 8, No. 4 (2014) 282-292 (Year: 2014).*
International Search Report and Written Opinion from PCT/EP2016/000052 dated Apr. 12, 2016.

* cited by examiner

*Primary Examiner* — Vu A Nguyen
(74) *Attorney, Agent, or Firm* — Fay Sharpe LLP

(57) ABSTRACT

The present invention relates to a flame retardant polypropylene composition for a conduit, appliance, and/or automotive wire, comprising a flame retardant composition comprising: a) a base resin comprising a heterophasic propylene copolymer which comprises a polypropylene homo- or copolymer matrix and an ethylene propylene rubber dispersed in said matrix, and b) a metal hydroxide or hydrated compound, wherein the heterophasic propylene copolymer has a MFR$_2$ below 0.8 g/10 min and a xylene cold soluble (XCS) fraction content between 1 and 15 wt % based on the total weight of the heterophasic propylene copolymer.

12 Claims, No Drawings

FLAME RETARDANT POLYPROPYLENE COMPOSITION

This application is a 371 of PCT Patent Application Serial No. PCT/EP2016/000052, filed Jan. 13, 2016, which claims priority to European Patent Application Serial No. 15000234.3, filed Jan. 27, 2015.

The present invention relates to a flame retardant polypropylene composition comprising a base resin and a metal hydroxide or hydrated compound.

The invention also relates to a wire or cable, in particular a conduit, appliance, and/or automotive wire comprising said composition, and to a process for the production of such a wire or cable.

Conduit, appliance, or automotive wires are cables, which apart from a conducting core and an optional thin skin layer often only have one polymer layer. This layer must fulfil several functions at the same time, which in other low voltage cables, medium and high voltage cables are fulfilled by separate layers. These functions comprise those of an insulation layer and an outer, protecting jacket.

Accordingly, a polymer composition used for the production of conduit, appliance, or automotive wires, must meet several demanding requirements at the same time, including good insulation behaviour, good mechanical properties, in particular good abrasion resistance, good flame retardant properties, good heat deformation resistance, withstand cold temperatures resistance to water and chemicals as well as good processing properties.

As mentioned, optionally the conduit, appliance, or automotive layer may further have a skin layer which may be coloured. However, said skin layer does not contribute to any significant extent to meet the requirements and to fulfil the functions discussed above. In some cases the conduit, appliance, or automotive layer may further comprise a thin layer for increasing abrasion resistance.

Polyvinyl chloride (PVC) has been widely used for coating of conduit, appliance or automotive wires in automobile applications. The reason for its use is that PVC has good mechanical stability, formability by extrusion, flexibility, and wear and flame resistance. On the other hand, from environmental considerations, the use of PVC is undesirable because of its halogen content as well as the release of poisonous and corrosive gases upon combustion. Further, automotive cables are classified into temperature classes, meaning that the cable must be able to withstand a continuous heat. For example, in class T3, the cable must withstand a continuous temperature of 125° C., which is too high for normal PVC cables.

For these reasons there has been a tendency to replace PVC in automotive applications with polyolefin compositions. However, polyolefins are inherently combustible materials and, as high flame resistance is required for automotive cables and wires, flame resistance of such polyolefin compositions is obtained with specific additives.

To obtain polyolefin compositions with improved flame resistance it is known for example to incorporate into the composition, halogen based chemicals or phosphate based chemicals. Each of these additives has however drawbacks, such as incompatibility with the polyolefin, water solubility, the presence or emission of harmful, toxic or otherwise undesirable compounds and/or high costs.

As the composition must be able to withstand operating temperatures up to 125° C. (class T3), crosslinked polyethylene (PE) or polypropylene (PP) compositions are used for such applications. A thermoplastic compound as PP has the advantage that the cables do not need to be crosslinked and it is therefore preferred. However, since PP becomes brittle at around −5° C., it is difficult to find a formulation that fulfils all the requirements of the specifications.

EP 1857502 describes a flame retardant composition comprising polypropylene, a polar ethylene and a metal hydroxide. The compositions have good abrasion resistance and good flame retardancy and are suitable for automotive wires larger than 0.7 mm$^2$. However for thinner wires, smaller or equal to 0.7 mm$^2$, the demanding specifications requirements cannot anymore be satisfied by these compositions.

It is therefore an object of the present invention to provide compositions having good flame retardancy and, at the same time, cold flexibility, thermo-oxidative ageing, ageing in combination with different media, abrasion resistance. In particular, the compositions should satisfy the newest GM specifications (GM15626) and German standard (LV112) which have resistance to needle abrasion as a mandatory requirement.

It has now been found that the object of the present invention can be achieved by a composition comprising:

a) a base resin comprising a heterophasic propylene copolymer which comprises a polypropylene homo- or copolymer matrix and an ethylene propylene rubber dispersed in said matrix, and b) a metal hydroxide or hydrated compound, wherein the heterophasic propylene copolymer has a MFR$_2$ below 0.8 g/10 min and a xylene cold soluble (XCS) fraction content between 1 and 15 wt % based on the total weight of the heterophasic propylene copolymer.

Generally, a heterophasic polypropylene is a propylene copolymer comprising a propylene homopolymer or propylene random copolymer matrix component and an elastomeric copolymer component of propylene with one or more of ethylene and/or C4-C8 α-olefin copolymers, wherein the elastomeric (amorphous) copolymer component is dispersed in said propylene homo or random copolymer matrix polymer. The elastomeric phase contains a propylene copolymer rubber, like ethylene propylene rubber (EPR). In the present invention the rubber component is a copolymer of propylene and ethylene and is mainly in amorphous form, measured as xylene cold soluble (XCS).

The XCS fraction of such heterophasic propylene copolymers comprises besides the total amount of rubber dispersed within the matrix also amorphous parts of the polypropylene matrix. However, in the common practice the XCS fraction is used to indicate the total amount of rubber of the heterophasic propylene copolymer as the amount of XCS fraction in the matrix component is markedly lower.

"Rubber" and "elastomeric copolymer/fraction/component" are used as synonyms in the context of the present invention The term "base resin" is herein intended to denote all polymeric components of the composition of the invention.

According to one embodiment the base resin comprises 90 wt %, preferably 95 wt % or 98 wt % and even more preferably 99 wt % of the heterophasic propylene copolymer based on the total weight of the base resin. Preferably then, the base resin does not contain any polar ethylene copolymer.

According to a preferred embodiment, the base resin consists of the heterophasic propylene copolymer. This is specifically advantageous for thinner wires, equal or smaller than 0.7 mm$^2$.

According to another preferred embodiment the base resin further comprise a polar ethylene copolymer.

Preferably the base resin, and hence also the total composition, is free of any grafted polypropylene component as having grafted polypropylene generates high costs.

Preferably, the composition is free of halogen- and phosphorous-containing compounds as flame retardancy aids. More preferably, the composition is entirely free of halogen-containing compounds. However, phosphorous containing-compounds may be present in the composition as stabilizers, usually in an amount of below 5000 ppm, more preferably below 2500 ppm.

Components of the composition may consist of a single compound or may also comprise a mixture of different compounds of the same category.

The propylene heterophasic copolymer comprises or consists of a polypropylene homo- or copolymer as matrix polymer and an ethylene propylene rubber dispersed in said matrix, According to a preferred embodiment, the matrix in the propylene heterophasic copolymer is made of propylene homopolymer.

The heterophasic copolymer according to the invention has a xylene cold soluble fraction content of 1 to 15 wt %, more preferably of 4 to 13 wt %, based on the total weight of the heterophasic propylene copolymer.

The heterophasic propylene copolymer preferably has a total amount of ethylene between 1 and 8.5 wt %, preferably between 1 and 7 wt %, more preferably between 1 and 5 wt %, based on the total weight of the heterophasic propylene copolymer.

The ethylene propylene rubber apart from ethylene and propylene monomer units may contain further alpha-olefin monomer units. However, it is preferred that the ethylene propylene rubber consists of ethylene and propylene monomer units.

The melt temperature of the heterophasic propylene copolymer preferably is higher than 150° C., more preferably higher than 160° C.

The heterophasic propylene copolymer has $MFR_2$ higher than 0.1 g/10 min and below 0.8 g/10 min, preferably below 0.5 g/10 min.

The heterophasic propylene copolymer may be produced by multistage process polymerisation of propylene and ethylene and optionally alpha-olefin such as bulk polymerisation, gas phase polymerisation, slurry polymerisation, solution polymerisation or combinations thereof using conventional catalysts. The heterophasic copolymer can be made either in loop reactors or in a combination of loop and gas phase reactor. Those processes are well known to one skilled in the art.

A preferred process is a combination of a bulk slurry loop reactor(s) and gas phase reactor(s). First, the propylene homo- or copolymer matrix is made either in loop reactor(s) or in a combination of loop and gas phase reactor.

The polymer produced in this way is transferred into another reactor and the disperse phase, the ethylene propylene rubber, is produced by copolymerising a mixture of ethylene and propylene with the same catalyst system, so obtaining a heterophasic system consisting of a semicrystalline matrix with a nearly amorphous elastomeric component dispersed within it. Preferably this polymerisation step is done in a gas phase polymerisation.

A suitable catalyst for the polymerisation of the heterophasic copolymer is any stereospecific catalyst for propylene polymerisation which is capable of polymerising and copolymerising propylene and comonomers at a temperature of 40 to 110° C. and at a pressure from 10 to 100 bar. Ziegler-Natta catalysts as well as metallocene catalysts are suitable catalysts.

Alternatively to producing the heterophasic copolymer in a sequential multistage process as described above, it can be produced by polymerising the matrix polymer and the ethylene propylene rubber in separate steps and melt blending the two polymers.

In order to further improve processability and melt strength, the flame retardant composition may preferably comprise a polypropylene showing strain hardening behavior. Such a polypropylene is e.g. described in EP 1 301 343. The definition of "strain hardening behavior" is given in paragraphs [0008] to [0010] of this document. As mentioned there, a polypropylene showing strain hardening behavior is defined to have a haul-off force higher than 15 cN and a drawability with a draw down velocity higher than 150 mm/s in the test as described in detail in EP 1 301 343 and as illustrated in FIGS. 1 and 2 thereof.

An ethylene propylene elastomeric copolymer may be produced by known polymerisation processes such as solution, suspension and gas-phase polymerisation using conventional catalysts. Ziegler-Natta catalysts as well as metallocene catalysts are suitable catalysts.

A widely used process is the solution polymerisation. Ethylene, propylene and catalyst systems are polymerised in an excess of hydrocarbon solvent. Stabilisers and oils, if used, are added directly after polymerisation. The solvent and unreacted monomers are then flashed off with hot water or steam, or with mechanical devolatilisation. The polymer, which is in crumb form, is dried with dewatering in screens, mechanical presses or drying ovens. The crumb is formed into wrapped bales or extruded into pellets.

The suspension polymerisation process is a modification of bulk polymerisation. The monomers and catalyst system are injected into the reactor filled with propylene. The polymerisation takes place immediately, forming crumbs of polymer that are not soluble in the propylene. Flashing off the propylene and comonomer completes the polymerisation process.

The gas-phase polymerisation technology consists of one or more vertical fluidised beds. Monomers and nitrogen in gas form along with catalyst are fed to the reactor and solid product is removed periodically. Heat of reaction is removed through the use of the circulating gas that also serves to fluidize the polymer bed. Solvents are not used, thereby eliminating the need for solvent stripping, washing and drying.

The production of ethylene propylene elastomeric copolymers is also described in detail in e.g. U.S. Pat. Nos. 3,300,459, 5,919,877, EP 0 060 090 A1 and in a company publication by EniChem "DUTRAL, Ethylene-Propylene Elastomers", pages 1-4 (1991).

Alternatively, elastomeric ethylene-propylene copolymers, which are commercially available and which fulfill the indicated requirements, can be used.

The heterophasic copolymer is then produced by combining the matrix polymer in the form of powder or granules and the elastomeric copolymer in a melt mixing device.

In case a polypropylene random copolymer is used as matrix polymer for the heterophasic copolymer, the comonomers preferably are linear alpha-olefins or branched alpha-olefins like ethylene, butene, hexene etc. In the present invention ethylene is most preferred. The comonomer content is preferably 10 wt % or less, more preferably is between 4 and 8 wt %, based on the total polypropylene random copolymer.

However, preferably the matrix polymer is a polypropylene homopolymer.

Preferably, the base resin a) is present in the composition in an amount of 30 to 52 wt %, more preferably 39 to 45 wt % or 40 to 45 wt % based on the weight of the total composition.

The base resin may further comprise a polar ethylene copolymer

The polar ethylene copolymer is preferably produced by copolymerisation of ethylene monomers with appropriate comonomers bearing polar groups.

It is preferred that the polar copolymer comprises a copolymer of ethylene, with one or more comonomers selected from C1- to C6-alkyl acrylates, C1- to C6-alkyl methacrylates, hydroxy functional monomers, e.g. 2-hydroxyethyl (meth-) acrylate, acrylic acids, methacrylic acids, vinyl acetate and vinyl silanes. For example, the polar copolymer may also be a terpolymer of ethylene, one of the above mentioned monomers and a vinyl silane. The copolymer may also contain ionomeric structures (like in e.g. DuPont's Surlyn types).

Still further preferred, the polar copolymer is an ethylene/acrylate, and/or ethylene/acetate, copolymer.

Further preferred, the polar polymer comprises a copolymer of ethylene with C1- to C4-alkyl, such as methyl, ethyl, propyl, i-butyl or n-butyl, acrylates or vinyl acetate. In a particularly preferred embodiment, the polar comonomer is butyl acrylate. In a particularly preferred embodiment, polar polyethylene is ethylene butyl acrylate copolymer (EBA).

In addition to ethylene and the defined comonomers, the copolymers may also contain further monomers. For example, terpolymers between acrylates and acrylic acid or methacrylic acid, or acrylates with vinyl silanes, or acrylates with siloxane, or acrylic acid with siloxane may be used.

These copolymers may be crosslinked after extrusion, e.g. by irradiation. Silane-crosslinkable polymers may also be used, i.e. polymers prepared using unsaturated silane monomers having hydrolysable groups capable of crosslinking by hydrolysis and condensation to form silanol groups in the presence of water and, optionally, a silanol condensation catalyst.

Preferably, the amount of comonomer units with polar groups in polar ethylene copolymer is 0.5 wt % or more, more preferably is 1.0 wt % or more, and most preferably is 2.0 wt % or more.

Furthermore, preferably the amount of comonomer units with polar groups in polar ethylene copolymer is 30 wt % or less, more preferably is 20 wt % or less, and most preferably is 17 wt % or less.

Polar ethylene copolymer preferably is present in the composition in an amount of 1 to 30 wt %, more preferably of 5 to 20 wt % based on the total weight of the composition.

The melt flow rate $MFR_2$ of polar ethylene copolymer preferably is 15 g/10 min or less, more preferably is 10 g/10 min or less, still more preferably is 5 g/10 min or less, still more preferably is 2 g/10 min or less, and most preferably is 1 g/10 min or less.

In the flame retardant polypropylene composition according to the invention component b) is preferably present in an amount of 47 to 62 wt %, preferably of 52 to 62 wt % based on the total weight of the composition.

In case the base resin consists of the heterophasic propylene copolymer, then the heterophasic propylene copolymer is more preferably between 55 to 60 wt % based on the weight of the total composition.

The polymer composition according to the invention may further comprise an ethylene copolymer, preferably single site catalyst prepared, having a density between 0.860 and 0.910 g/cm³. Preferably the ethylene copolymer (B) has a density between 0.870 and 0.905 g/cm³, more preferably between 0.875 and 0.900 g/cm³.

The ethylene copolymer may be prepared in a low pressure reactor through the use of a class of highly active olefin catalysts known as metallocenes, preferably those based on group IV B transition metal, zirconium, titanium and hafnium.

The ethylene copolymer conveniently comprises comonomer units derived from C4 to C12 α-olefin, more preferably C8 to C12 α-olefin. Even more preferably the comonomer units of the ethylene copolymer consist of comonomer units derived from C4 to C12 α-olefin, more preferably C8 to C12 α-olefin. Most preferably, the α-olefin is octane. Conveniently, the ethylene copolymer has a melting point of at least 65° C. and below 110° C.

The melt flow rate, $MFR_2$, of the ethylene copolymer preferably is 15 g/10 min or less, more preferably is 10 g/10 min or less, still more preferably is 5 g/10 min or less, still more preferably is 2 g/10 min or less, and most preferably is 1 g/10 min or less.

The ethylene copolymer is preferably present in the polymer composition in an amount between 2 and 30 wt % of the total polymer composition, preferably between 5 and 20 wt %.

Preferably, component b) comprises, more preferably consists of, a metal hydroxide, more preferably a metal hydroxide of a metal of groups 1 to 13, more preferred groups 1 to 3 of the Periodic Table of Elements. The numbering of chemical groups, as used herein, is in accordance with the IUPAC system in which the groups of the periodic system of the elements are numbered from 1 to 18.

Still more preferably component b) comprises, more preferably consists of, a hydroxide selected from the group of magnesium, calcium, potassium, barium and aluminum or magnesium, calcium and potassium, and most preferred component b) comprises, more preferably consists of, magnesium hydroxide.

Preferably, compound b) comprises, more preferably consists of, a metal hydroxide or hydrated compound, which has been surface-treated with an organo silane compound, a polymer, a carboxylic acid or salt etc. to aid processing and provide better dispersion of the hydroxide/hydrated compound in the organic polymer. Such coatings usually do not make up more than 3 wt % of the hydroxide/hydrated compound. Examples for coated $Mg(OH)_2$ are Magnifin H5HV commercially available from Martinswerke, Germany, or Kisuma 5AU available from Kisuma Chemicals BV.

Preferably the base resin a) and the metal hydroxide or hydrated compound b) make up to 80 wt %, more preferably to 90 wt % or 95 wt % of the total composition.

Preferably the base resin a) and the metal hydroxide or hydrated compound b) make up to 80 wt % or 90 wt % or 95 wt % of the total composition, and the base resin a) is present in the composition in an amount between 35 and 60 wt %, preferably between 38 and 53 wt % or 38 and 48 wt % or 40 to 45 wt % and the metal hydroxide or hydrated compound b) in an amount from 40 to 65 wt % or 47 to 62 wt %, preferably from 52 to 62 wt % or 55 to 60 wt % based on the total weight of the composition.

According to a preferred embodiment the base resin a) consists of the heterophasic propylene copolymer, the heterophasic propylene copolymer is preferably present in the composition in an amount between 40 to 45 wt % and the metal hydroxide or hydrated compound b) in an amount from 55 to 60 wt % based on the weight of the total composition.

In addition to the above-mentioned components, the composition may contain further ingredients, such as for example antioxidants and or UV stabilizers, pigments, cure boosters, process aids etc. in small amounts.

The flame retardant polymer composition of the present invention shows a superior abrasion resistance, so that it withstands in the abrasion test according to ISO 6722 (needle diameter 0.45 mm) on a cable with a conductor cross section of 0.35 mm$^2$, 100 cycles or more.

The present invention further relates to a wire or cable comprising a layer made of the flame retardant polypropylene composition in any of the above described embodiments.

Preferably, the wire or cable is a conduit, appliance, or automotive wire consisting of an inner conductor core surrounded by a flame retardant layer made of a polypropylene composition in any of the above described embodiments, and, optionally, an outer skin layer.

The flame retardant layer of such a conduit, appliance, or automotive wire preferably has a thickness of 0.1 to 4 mm.

In case an outer skin layer is present, it has preferably a maximum thickness of 0.6 mm.

However, it is preferred that there is no skin layer present in the final cable, i.e. that the insulation layer is the outermost layer.

Still further, the conductor area of such a conduit, appliance, or automotive wire preferably is from 0.1 to 400 mm$^2$.

The invention furthermore relates to a process for the production of a flame retardant layer of a wire or cable comprising forming into such a layer a composition in any of the above described embodiments, and to the use of the flame retardant polypropylene composition in any of the above described embodiments for the production of a flame retardant layer of a wire or cable.

The flame retardant polymer composition forming the layer of the cable or wire according to the invention may be prepared by:

i) preparation of a master batch comprising additives and polymer followed by ii) compounding with inorganic filler and matrix polymer or one step compounding of all components.

For mixing, a conventional compounding or blending apparatus, e.g. a Banbury mixer, a 2-roll rubber mill, Buss-co-kneader or a twin screw extruder may be used. Preferably, the composition will be prepared by blending them together at a temperature which is sufficiently high to soften and plasticize the polymer, typically a temperature in the range of 180 to 250° C.

The polymer composition preferably is extruded to form the flame retardant layer. This is preferably done at a line speed of at least 20 m/min, more preferably at least 60 m/min and most preferably at least 100 m/min. The pressure used for extrusion preferably is 50 to 500 bar.

In the following the present invention is further illustrated by means of examples.

1. TEST METHODS a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR$_2$ of polypropylene is measured at a temperature 230° C. and a load of 2.16 kg.

b) Flame Retardancy

Fame retardancy is measured according to ISO 6722: 2006, paragraph 12 (resistance to flame propagation). The purpose of said test method is to determine the resistance to flame propagation for automotive cables. The cable (600 mm) is installed at a 45 deg. angle to the vertical line and a flame produced by a Bunsen burner, fed with an appropriate gas, having a combustion tube of 9 mm internal diameter, and a flame height of 100 mm is applied onto the cable sample at a 90 deg. angle 500 mm from the upper end of the insulation.

The test sample shall be exposed to the tip of the inner blue cone of the flame having a length of 50 mm. For cables having a conductor size of equal or smaller 2.5 mm$^2$ the flame is applied for 15 seconds. In order to fulfil the test, the flame should extinguish within 70 seconds after the burner flame has been taken away with a minimum of 50 mm of insulation from its top remaining unburned. A wire fulfilling this criterion is marked "pass", otherwise it is marked "fail".

c) Scrape Abrasion

The abrasion test is performed in full accordance with ISO 6722:2006, paragraph 9.3. The abrasion resistance as reported is based on the testing of a wire sample based on a 0.35 mm$^2$ 18 AWG stranded copper conductor with the nominal layer wall thickness being 0.24 mm (actual 0.4 mm). The needle diameters used are 0.45 mm, the force 7 Newton, and the tested samples are not crosslinked. Results are given in Table 3, and are reported as cycles which the material is able to withstand. For every wire tested, twelve samples are tested and the average and minimum number of strokes are reported. If any of the samples withstand less than 200 strokes it is reported as failure in Table 3.

d) Xylene Cold Soluble (XCS) Fraction Content

The amount of xylene cold soluble fraction is determined according to ISO 16152. The amount of polymer which remains dissolved at 25° C. after cooling is given as the amount of xylene soluble polymer. The content of xylene soluble polymer is herein assumed to follow the mixing rule:

$$XS_b = w_1 XS_1 + w_2 XS_2$$

Where XCS is the content of xylene soluble polymer in weight-%, w is the weight fraction of the component in the mixture and subscripts b, 1 and 2 refer to the overall mixture, component 1 (matrix component) and component 2 (elastomeric component) respectively.

e) Ethylene Content Both as Total Amount in the Heterophasic Propylene Copolymer and as Amount in the Sole Elastomeric Phase.

The comonomer content is determined by quantitative Fourier transform infrared spectroscopy (FTIR) after basic assignment calibrated via quantitative $^{13}$C nuclear magnetic resonance (NMR) spectroscopy in a manner well known in the art.

Thin films are pressed to a thickness of between 100-500 micrometer and spectra recorded in transmission mode. Specifically, the ethylene content of a polypropylene-co-ethylene copolymer is determined using the baseline corrected peak area of the quantitative bands found at 720-722 and 730-733 cm$^{-1}$. Specifically, the butene or hexene content of a polypropylene copolymer is determined using the baseline corrected peak area of the quantitative bands found at 1377-1379 cm$^{-1}$. Quantitative results are obtained based upon reference to the film thickness.

The comonomer content is herein assumed to follow the mixing rule below:

$$C_b = w_1 C_1 + w_2 C_2$$

where C is the content of comonomer in weight-%, w is the weight fraction of the component in the mixture and subscripts b, 1 and 2 refer to the overall mixture, component 1 (matrix component) and component 2 (elastomeric component), respectively.

As it is well known to the person skilled in the art the comonomer content in weight basis in a binary copolymer can be converted to the comonomer content in mole basis by using the following equation:

$$cm = \frac{1}{1 + \left(\frac{1}{CW} - 1\right) * \frac{MWc}{MWm}}$$

wherein cm is the mole fraction of comonomer units in the copolymer, cw is the weight fraction of comonomer units in the copolymer, MWc is the molecular weight of the comonomer (such as ethylene) and MWm is the molecular weight of the main monomer (i.e., propylene).

f) Density

Density is measured in accordance with ISO 1183 on compression moulded plaques.

g) Flexural Modulus

The flexural modulus is determined according to ISO 178. The test specimens having a dimension of 80×10×4.0 mm$^3$ (length×width×thickness) are prepared by injection molding according to EN ISO 1873-2. The length of the span between the supports is 64 mm, the test speed is 2 mm/min and the force is 100 N.

h) Charpy Impact Strength Notched

Charpy impact strength notched is determined according to ISO 179-1eA:2000 on V-notched samples of 80×10×4 mm$^3$ at 23° C., 0° C., and −23° C. as specified in the examples. The test specimens are prepared by injection moulding using an IM V60 TECH machinery in line with EN ISO 1873-2 (80*10×4 mm$^3$). The melt temperature is 200° C. and the mould temperature is 40° C.

i) Cold Flexibility (Low-Temperature Winding Test)

Cold flexibility is measured in accordance with ISO6722:2006, paragraph 8. The wire is fixed on a rotable mandrel and put in a freezing chamber at 40° C. for 4 hours. After exposure, the test sample is allowed to return to room temperature and a visual inspection of the insulation is made. If no exposed conductor is visible the 1 kVolt, 1 minute withstand voltage test is performed. In the prior voltage test the sample is immersed in salt water bath for 10 minutes. The sample is marked as "pass" in Table 3 if neither exposed conductor nor breakdown during the withstand voltage test is observed.

j) Thermal Overload in Wound State

Thermal overload is controlled in accordance with ISO6722:2006, paragraph 10.3. The wire is placed in a heating oven at 175° C. for six hours following by a conditioning of minimum 16 hours at room temperature in accordance with paragraph 10.1.4. Thereafter the wire is put on a mandrel defined in Table 8 of ISO6722:2006. No conductor shall be visible and during the withstand voltage test, breakdown shall not occur.

2. EXAMPLES

In the preparation of the inventive compositions (Ex1-Ex3) heterophasic propylene copolymers BA202E, BA212E, available from Borealis AG and PP-EPR1 are used. PP-EPR1 is prepared as follows:

Catalyst Preparation

First, 0.1 mol of $MgCl_2 \times 3$ EtOH is suspended under inert conditions in 250 ml of decane in a reactor at atmospheric pressure. The solution is cooled to the temperature of −15° C. and 300 ml of cold $TiCl_4$ is added while maintaining the temperature at said level. Then, the temperature of the slurry is increased slowly to 20° C. At this temperature, 0.02 mol of diethylhexylphthalate (DOP) is added to the slurry. After the addition of the phthalate, the temperature is raised to 135° C. during 90 minutes and the slurry is allowed to stand for 60 minutes. Then, another 300 ml of $TiCl_4$ is added and the temperature is kept at 135° C. for 120 minutes. After this, the catalyst is filtered from the liquid and washed six times with 300 ml heptane at 80° C. Then, the solid catalyst component is filtered and dried. Catalyst and its preparation concept is described in general e.g. in patent publications EP 491 566, EP 591 224 and EP 586 390.

Then triethylaluminium (TEAL), dicyclopentyldimethoxysilane (DCPDMS) as donor (Do), catalyst as produced above and vinylcyclohexane (VCH) is added into oil, like mineral oil, e.g. Technol 68 (kinematic viscosity at 40° C. 62-74 cSt), in amounts so that Al/Ti is 3-4 mol/mol, Al/Do is as well 3-4 mol/mol, and weight ratio of VCH/solid catalyst is 1:1.

The mixture is heated to 60-65° C. and allowed to react until the content of the unreacted vinylcyclohexane in the reaction mixture is less than 1000 ppm. Catalyst concentration in the final oil-catalyst slurry is 10-20 wt %.

Polymerization

In PP-EPR1 the matrix is made of a propylene homopolymer which is prepared in a loop reactor and a gas phase reactor (GPR1). The obtained polymer is stabilized with conventional stabilizer and antioxidant. Further information about the propylene homopolymer constituting the matrix is shown in the table below.

Subsequently, the propylene homopolymer is transferred to a second gas phase reactor (GPR2) where the elastomeric polypropylene is prepared. The obtained polymer is stabilized in a conventional twin screw extruder with conventional stabilizers, i.e. calcium stearate and phenolic antioxidant, in conventional amounts, and pelletized for further testing as given in Table 1.

For the preparation of comparative compositions (CE1-CE4) polypropylenes HA507MO (propylene homopolymer), RA130E (random propylene copolymer) and heterophasic propylene copolymers BA125MO and BA204E, available from Borealis AG, are used.

TABLE 1

| Process parameters | HPC1 |
|---|---|
| Catalyst feed (g/h) | 5.0 |
| Ti content % | 1.9 |
| Donor feed (g/t propylene) | 80 |
| Al/Ti ratio (mol/mol) | 127 |
| Al/donor ratio (mol/mol) | 5.0 |
| Prepolymerisation | |
| Temperature (° C.) | 40 |
| Hydrogen feed (g/h) | 0.5 |
| Loop reactor | |
| Temperature (° C.) | 85 |
| Pressure (kPa) | 5462 |

TABLE 1-continued

|  | HPC1 |
| --- | --- |
| H2/C3 ratio (mol/kmol) | 0.07 |
| MFR10 (g/10 min) | 1.1 |
| Gas phase reactor 1 | |
| Temperature (° C.) | 95 |
| Pressure (kPa) | 2301 |
| H2/C3 ratio (mol/kmol) | 214 |
| MFR2 (g/10 min) | 0.33 |
| Gas phase reactor 2 | |
| Temperature (° C.) | 50 |
| Pressure (kPa) | 2000 |
| C2/C3 ratio (mol/kmol) | 700 |
| H2/C2 ratio (mol/kmol) | 14 |

The properties of all the polymers are listed in Table 2.

TABLE 2

|  | BA 202E | BA 212E | PP-EPR1 | BA 125MO | BA 204E | HA507 MO | RA 130E |
| --- | --- | --- | --- | --- | --- | --- | --- |
| MFR$_2$ (g/10 min) | 0.3 | 0.3 | 0.3 | 1.3 | 0.8 | 0.8 | 0.25 |
| Density (Kg/m$^3$) | 900 | 900 | 900 | 905 | 900 | 908 | 905 |
| XCS (wt %) | 13 | 10 | 4.5 | 16 | 13 | 2.5 | 7 |
| Total Ethylene (wt %) | 8.5 | 4.4 | 1.4 | 10 | 8.5 | 0 | 3.6 |
| Ethylene in EPR (wt %) | 65 | 45 | 30 | 60 | 65 | — | — |
| Flexural Modulus (Mpa) | 1300 | 1700 | 2000 | 1200 | 1100 | 1500 | 800 |
| Charpy notched 23° C./−23° C. (kJ/m$^2$) | 50/5 | 50/5 | 29/2 | 50/7 | 35/4 | 6/— | 20/2 |

The polymer compositions of all the examples are produced by compounding together the polymers listed in Table 2 with Magnifin H5HV (Mg(OH)$_2$) from Martinswerke, Germany and with Irganox 1010, Irganox 1024 and Irganox PS 802 (antioxidants).

The amount in wt % of each component for both inventive and comparative examples is given in Table 3.

A Buss Co-kneader type PR46B-11D/H1 is used for the compounding.

TABLE 3

|  | Ex 1 | Ex 2 | Ex 3 | CE1 | CE2 | CE3 | CE4 |
| --- | --- | --- | --- | --- | --- | --- | --- |
| BA202E | 41.4 | | | | | | |
| BA212E | | 41.4 | | | | | |
| PP-EPR1 | | | 41.4 | | | | |
| BA125MO | | | | 38.9 | | | |
| BA204E | | | | | 41.4 | | |
| HA507MO | | | | | | 41.4 | |
| RA130E | | | | | | | 41.4 |
| Magnifin H5HV | 57.5 | 57.5 | 57.5 | 60 | 57.5 | 57.5 | 57.5 |
| Irganox 1010 | 0.4 | 0.4 | 0.4 | 0.4 | 0.4 | 0.4 | 0.4 |
| Irganox 1024 | 0.2 | 0.2 | 0.2 | 0.2 | 0.2 | 0.2 | 0.2 |
| Irganox PS802 | 0.5 | 0.5 | 0.5 | 0.5 | 0.5 | 0.5 | 0.5 |

Automotive wires of 0.35 mm$^2$ (7×0.254 mm diameter single wires) are produced from the compositions on a Nokia-Maillefer extruder, 45 mm/28D, with a temperature profile of: 165-185-200-215-220 (Bride)-230(Flansch)-235 (Bypass)-250 (Head)-250° C. (Pressure die).

The outer diameter of the cable is 1.28 mm and the wall thickness 0.24 mm.

The melt temperature is of 220° C. and a line speed of 100 m/min. The conductor is preheated to a setting temperature of 90° C. The compound is pre-dried for 18 hours at 80° C. prior extrusion.

The properties of the 0.35 mm$^2$ cables are listed in Table 4. The tests are made according to LV112 and ISO6722 (Jan. 17, 2014).

TABLE 4

|  | Ex 1 | Ex 2 | Ex 3 | CE1 | CE2 | CE3 | CE4 |
| --- | --- | --- | --- | --- | --- | --- | --- |
| Flame retardancy | Pass | Pass | Pass | Pass | Fail | Pass | Fail |
| Cold flexibility 40° C. | Pass | Pass | Pass | Pass | Pass | Fail | Pass |
| Needle abrasion min. 200 cycles | Pass | Pass | Pass | Fail | Fail | Pass | Fail |
| Minimum N° of cycles | 200 | 530 | 985 | 16 | 135 | 260 | 49 |
| Avarage N° of cycles | 270 | 600 | 1300 | 19 | 250 | 530 | 55 |
| Thermal overload in wound state | Pass | Pass | Pass | Fail | Pass | Pass | Fail |

From Table 4 it can clearly be seen that for thin wires the required cycles of 200 strokes in the needle abrasion test is only met by the inventive compositions and the comparative composition 3, which, however, shows inferior low temperature properties. The other properties are at best for inventive examples 2 and 3.

It is thereby shown that only specific types of heterophasic copolymers are suitable for automotive, conduit and appliance wires.

The invention claimed is:

1. A flame retardant composition comprising:
    a) a base resin consisting of a heterophasic propylene copolymer which comprises a polypropylene homo- or copolymer matrix and an ethylene propylene rubber dispersed in said matrix, and
    b) a metal hydroxide,
    wherein the heterophasic propylene copolymer has a MFR$_2$ below 0.8 g/10 min and a xylene cold soluble (XCS) fraction content between 1 and 15 wt % based on the total weight of the heterophasic propylene copolymer.

2. The composition of claim 1 wherein the heterophasic propylene copolymer has a total amount of ethylene between 1 and 8.5 wt % based on the total weight of the heterophasic propylene copolymer.

3. The composition of claim 1 wherein the MFR$_2$ of the heterophasic propylene copolymer is below 0.5 g/10 min.

4. The composition according to claim 1 wherein the base resin a) and the metal hydroxide b) make up to 80 wt % of the total composition.

5. The composition according to claim 1 wherein the base resin a) is present in the composition in an amount between 30 and 52 wt % and the metal hydroxide b) in an amount from 47 to 62 wt % based on the total weight of the composition.

6. The composition according to claim 1 wherein the composition comprises 40 to 45 wt % of the heterophasic propylene copolymer and 55 to 60 wt % of the metal hydroxide based on the total weight of the composition.

7. A flame retardant composition comprising:
    a) a base resin comprising a heterophasic propylene copolymer which comprises a polypropylene homo- or copolymer matrix and an ethylene propylene rubber dispersed in said matrix, and
    b) a metal hydroxide,
    wherein the heterophasic propylene copolymer has a MFR$_2$ below 0.8 g/10 min and a xylene cold soluble (XCS) fraction content between 1 and 15 wt % based on the total weight of the heterophasic propylene copolymer;

wherein the base resin further comprises an ethylene copolymer having a density between 0.860 to 0.910 g/cm$^3$.

8. The composition according to claim 7 wherein the ethylene copolymer is present in the composition in an amount between 2 to 30 wt % based on the total weight of the composition.

9. The composition according to claim 1 wherein the metal hydroxide b) comprises magnesium hydroxide.

10. A flame retardant composition comprising:
a) a base resin comprising a heterophasic propylene copolymer which comprises a polypropylene homo- or copolymer matrix and an ethylene propylene rubber dispersed in said matrix, and
b) a metal hydroxide,
wherein the heterophasic propylene copolymer has a MFR$_2$ below 0.8 q/10 min and a xylene cold soluble (XCS) fraction content between 1 and 15 wt % based on the total weight of the heterophasic propylene copolymer;
wherein the base resin further comprises an ethylene butylacrylate (EBA) having a density between 0.860 to 0.910 g/cm$^3$.

11. The composition according to claim 5 wherein the metal hydroxide b) comprises magnesium hydroxide.

12. The composition according to claim 7 wherein the metal hydroxide b) comprises magnesium hydroxide.

* * * * *